United States Patent [19]

Hirako et al.

[11] Patent Number: 5,079,709
[45] Date of Patent: Jan. 7, 1992

[54] TRACTION CONTROL METHOD AND APPARATUS FOR A VEHICLE

[75] Inventors: Atsushi Hirako; Akihiro Shirata, both of Kanagawa; Naoyuki Hagiya; Yoshiaki Yabe, both of Saitama; Shigeki Moride, Kanagawa, all of Japan

[73] Assignees: Isuzu Motors Limited, Tokyo; Fujitsu Limited, Kanagawa; Akebono Brake Industry Co., Ltd., Tokyo; Akebono Research and Development Centre Ltd., Saitama, all of Japan

[21] Appl. No.: 633,176

[22] Filed: Dec. 28, 1990

Related U.S. Application Data

[63] Continuation of Ser. No. 404,522, Sep. 8, 1989, abandoned.

[30] Foreign Application Priority Data

Sep. 16, 1988 [JP] Japan .................................. 63-229852

[51] Int. Cl.$^5$ ............................................. B60K 28/16
[52] U.S. Cl. .................... 364/426.02; 180/197
[58] Field of Search ............... 364/426.02, 426.03, 364/431.07; 180/197; 303/97, 99, 105

[56] References Cited

U.S. PATENT DOCUMENTS

| | | | |
|---|---|---|---|
| 4,736,814 | 4/1988 | Yogo | 364/426.03 |
| 4,811,808 | 3/1989 | Matsumoto et al. | 180/197 |
| 4,843,552 | 6/1989 | Wagaki | 364/426.03 |
| 4,866,618 | 9/1989 | Tamura et al. | 364/426.02 |
| 4,866,623 | 9/1989 | Ise et al. | 364/426.03 |
| 4,873,638 | 10/1989 | Shiraishi et al. | 364/426.02 |

Primary Examiner—Gary Chin
Attorney, Agent, or Firm—Finnegan, Henderson, Farabow, Garrett, and Dunner

[57] ABSTRACT

A method of controlling a traction of a vehicle, comprising the steps of reading a value determining a throttle opening and closing speed from a first throttle control map from which said throttle opening and closing speed are determined on the basis of a difference in speed between a driving and non-driving wheel speeds and of an acceleration of the driving wheel, and converting said value to an actual throttle opening and closing speed with a conversion rate corresponding to an acceleration of the non-driving wheel thereby controlling the throttle of the vehicle.

7 Claims, 4 Drawing Sheets

TRACTION CONTROL METHOD AND APPARATUS FOR A VEHICLE

This application is a continuation of application Ser. No. 07/404,522, filed Sept. 8, 1989, now abandoned.

FIELD OF THE INVENTION

The present invention relates generally to a traction control method for a vehicle. More particularly, the invention relates to a traction control method for a vehicle which is capable of detecting a slip of a driving wheel which tends to be caused when the vehicle starts or accelerates, controlling a brake operation of the driving wheel in accordance with the detection of the slip, and eliminating the slip of the driving wheel.

BACKGROUND OF THE INVENTION

A conventional traction control apparatus has been known to eliminate a slip of a driving wheel of a vehicle when the vehicle starts or accelerates particularly while the vehicle is running on a low-friction road surface such as a frozen, snow-covered or muddy one, so that a driving stability and a starting/accelerating performance can be improved. In such an apparatus as disclosed in Unexamined Japanese Patent Application (OPI) No. 61-85248, each of slip conditions of left and right driving wheels can be detected, and when the extent of the slip exceeds a predetermined value, a braking operation is controlled by increasing a brake fluid pressure applied to the brake device for the driving wheel and, simultaneously, a throttle operation is controlled to thereby decrease an output of an engine.

According to the conventional throttle operation control, a difference in speed between the driving wheel and the non-driving wheel is determined as one factor, and an acceleration degree of the driving wheel is determined as another factor. The throttle operation is controlled by using a throttle control map from which an open-and-close speed of the throttle according to the difference in the wheel speeds and the acceleration degree can be determined.

However, in such a conventional throttle operation control using the control map thus operated, the throttle operation can hardly be controlled with high accuracy corresponding to actual conditions of the vehicle and the road surface.

In another conventional throttle operation control as disclosed in U.S. Pat. No. 4,736,814, it is proposed that an open-and-close speed of a throttle valve is controlled in accordance with a comparison of a corrected driving wheel speed and a reference speed. However, the open-and-close speed of the throttle valve is not controlled in view of a friction coefficient of a road surface so that optimum control cannot be attained.

SUMMARY OF THE INVENTION

In view of the above problem and difficulty accompanying the conventional traction control apparatus, an object of the present invention is to provide a traction control method and apparatus capable of attaining an appropriate throttle operation control with high accuracy which control corresponds to a slip condition of a driving wheel using a throttle control map and computing a friction coefficient of a road surface on which the vehicle is running by detecting also an acceleration degree of a non-driving wheel of the vehicle.

The above and other objects of the invention can be achieved by a provision of a traction control method in which, according to the invention, a throttle open-and-close speed is read from a throttle control map by which the throttle open-and-close speed can be determined in accordance with a difference between a driving wheel speed and a non-driving wheel speed, and with an acceleration degree of a driving wheel, the throttle open-and-close speed thus read is converted into an actual throttle open-and-close speed on the basis of a conversion rate corresponding to an acceleration degree of a non-driving wheel, so that the throttle operation can suitably and accurately be controlled.

DESCRIPTION OF THE PREFERRED EMBODIMENTS

A preferred embodiment of the present invention will now be described in detail with reference to accompanying drawings.

Figure 1:
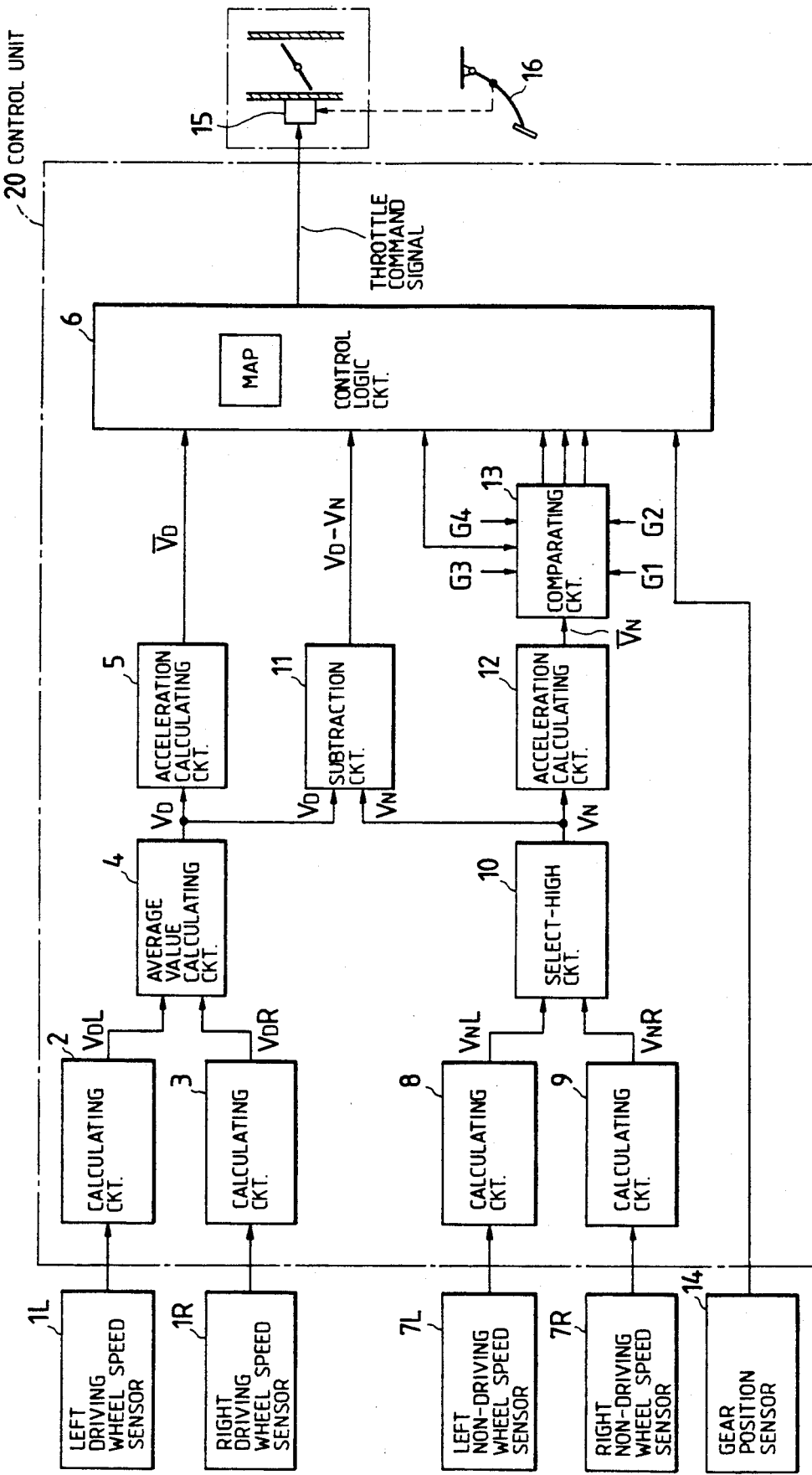
FIG. 1 is a block diagram showing a traction control apparatus embodying the present invention.

FIG. 1 shows a traction control apparatus according to the present invention.

In the traction control apparatus shown in FIG. 1, there are provided left and right driving wheel speed sensors 1L and 1R which detect a rotational speed of left and right driving wheels, respectively. Outputs of the left and right driving wheel speed sensors 1L and 1R are supplied to respective calculating circuits 2 and 3 provided in a control unit 20 and which output driving wheel speeds $V_DL$ and $V_DR$, respectively. The driving wheel speeds $V_DL$ and $V_DR$ are averaged by an average value calculating circuit 4, which outputs a driving wheel speed $V_D$ to an acceleration calculating circuit 5 which outputs a calculated acceleration $\overline{V}_D$. A control logic circuit 6 accepts the acceleration $\overline{V}_D$ from the acceleration calculating circuit 5.

Similarly, the rotational speed of left each of and right non-driving wheels is detected by left and right non-driving wheel speed sensors 7L and 7R, respectively. Calculating circuits 8 and 9 accept the output signals of the respective sensors 7L and 7R, and output non-driving wheel speeds $V_NL$ and $V_NR$, respectively. A higher one of the non-driving wheel speeds $V_NL$ and $V_NR$ is selected by a select-high circuit 10 and computed as a non-driving speed $V_N$ which is approximate to the actual vehicle speed.

The driving wheel speed $V_D$ and the non-driving wheel speed $V_N$ are subtracted by a subtraction circuit 11 which outputs a speed difference $V_D-V_N$ to the control logic circuit 6.

The non-driving wheel speed $V_N$ is further applied to an acceleration calculating circuit 12 which outputs a non-driving wheel acceleration degree $\overline{V}_N$ to a comparison circuit 13. The comparison circuit 13 compares the non-driving wheel acceleration degree $\overline{V}_N$ with predetermined acceleration values G1 and G2 (G1<G2) when the throttle is controlled to close. On the other hand, the non-driving wheel acceleration degree $\overline{V}_N$ is compared with predetermined acceleration values G3 and G4 (G3<G4) when the throttle is controlled to open. Each of the comparison results is accepted by the control logic circuit 6. The control logic circuit 6 further accepts an output signal of a gear position sensor 14 which detects a position of a gear provided in a transmission device.

Figure 2:
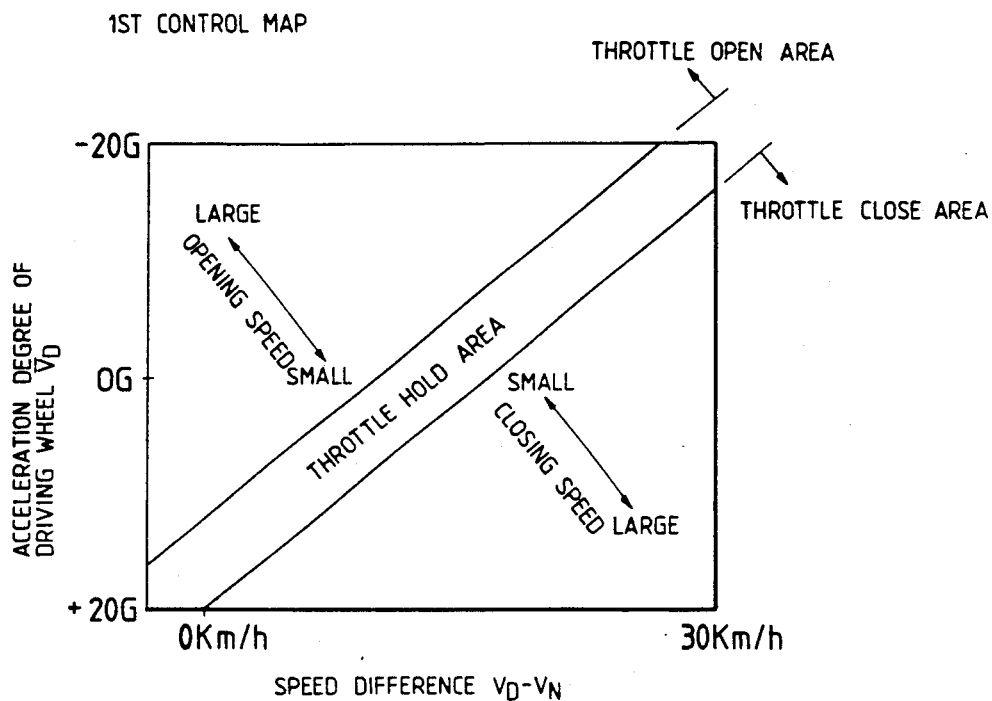
FIG. 2 shows a first control map according to the invention.

The control logic circuit 6 stores therein three control maps. A first control map is as shown in FIG. 2, an abscissa of which is a difference in speed $(V_D-V_N)$ between the driving and non-driving wheels and a ordinate of which is the driving wheel acceleration degree $\overline{V}_D$. The first map includes a throttle closing area, a throttle holding area, and a throttle opening area. A throttle closing speed in the throttle closing area is set so as to be increasing towards right-and-down direction of the map. Further, a throttle opening speed in the throttle opening area is set so as to be increasing towards left-and-up direction of the map.

Figure 3:
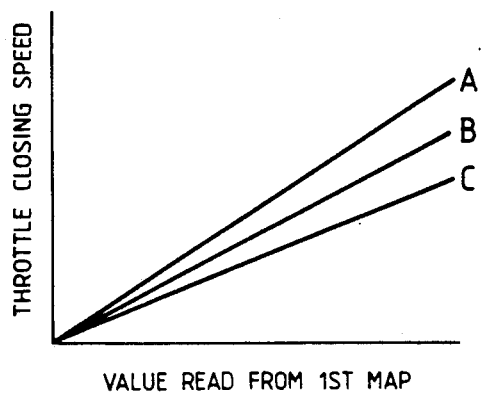
FIG. 3 shows a second control map.

A second control map is a conversion map employed during the throttle closing control as shown in FIG. 3, an abscissa of which is a value read from the first control map shown in FIG. 2 and an ordinate is a throttle closing speed. In the second control map, there are provided three lines A, B and C different in gradient from one another in accordance with parameters of the non-driving wheel acceleration $\overline{V}_N$. The second control map converts the value read from the first map to a throttle closing speed. In the second map, the line A is a conversion line used under a condition in which the non-driving wheel acceleration $\overline{V}_N$ is equal to or smaller than the predetermined acceleration value G1 ($\overline{V}_N \leq G1$). The line B is a conversion line used under a condition in which $G1 < \overline{V}_N \leq G2$, and the line C is a conversion line used under a condition in which $G2 < \overline{V}_N$. As is apparent from FIG. 3, the throttle closing speed increases when the non-driving wheel acceleration $\overline{V}_N$ is small.

Figure 4:
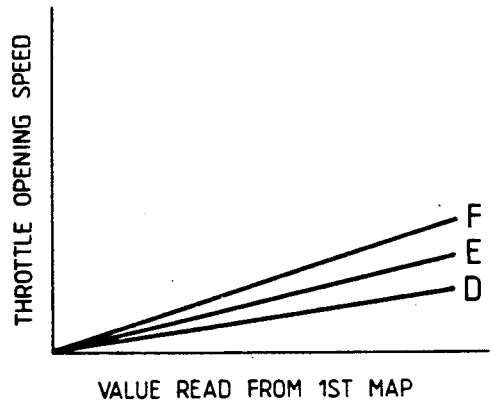
FIG. 4 shows a third control map.

A third control map is a conversion map employed during a throttle opening control, as shown in FIG. 4, an abscissa of which is a value read from the first control map shown in FIG. 2 and an ordinate of which is the throttle opening speed. In the third control map, there are provided three lines D, E and F different in gradient from one another in accordance with parameters of the non-driving wheel acceleration $\overline{V}_N$. The third control map converts the value read from the first control map shown in FIG. 2 to the throttle opening speed. In the third map, the line D is a conversion line used under a condition in which the non-driving wheel acceleration $\overline{V}_N$ is equal to or smaller than the predetermined acceleration value G3 ($\overline{V}_N \leq G3$). The line E is a conversion line used under a condition in which $G3 < \overline{V}_N < G4$, and the line F is a conversion line used under a condition in which $G4 < \overline{V}_N$. As is apparent from FIG. 4, the throttle opening speed decreases when the non-driving wheel acceleration $\overline{V}_N$ is small in contrast to the second map shown in FIG. 3. In this case, the predetermined acceleration value G1 may be equal to the value G3, and the value G2 may be equal to the value G4.

The control logic circuit 6 determines the throttle closing and opening speeds on the basis of the first, second and third control maps as described above, and outputs a throttle command signal to a throttle driving system 15 shown in FIG. 1 so that the throttle operation is controlled thereby effectively eliminating a slip of the driving wheel of the vehicle. In FIG. 1, the reference numeral 16 designates a brake pedal of the vehicle.

Figure 5:
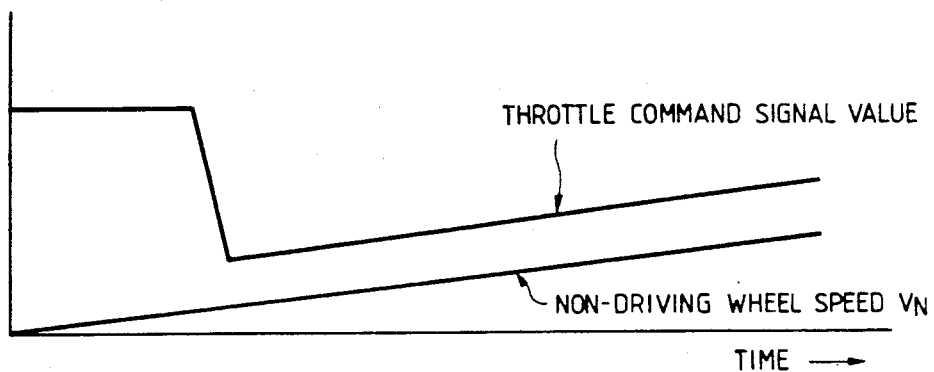
FIGS. 5 and 6 are timing charts employed in explaining an operation of the traction control apparatus of the invention.
Figure 6:
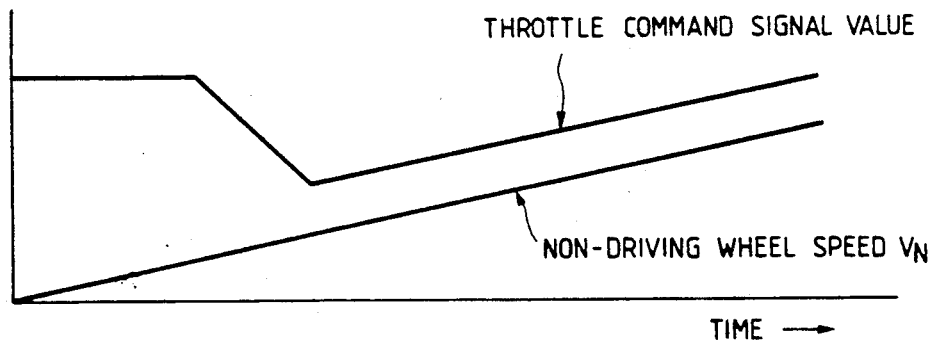

FIGS. 5 and 6 are timing charts showing a relation between the non-driving wheel speed $V_N$ and the throttle command signal outputted from the control logic circuit 6. As shown in FIG. 5, when the non-driving wheel acceleration $\overline{V}_N$ is small, the throttle closing speed is controlled to be high, the throttle opening speed is controlled to be low. Further, as shown in FIG. 6, when the non-driving acceleration $\overline{V}_N$ is large, the throttle closing speed is controlled to be low, the throttle opening speed is controlled to be high, so that the vehicle moves with a maximum adhesion between the road surface and tire of the vehicle.

Figure 7:
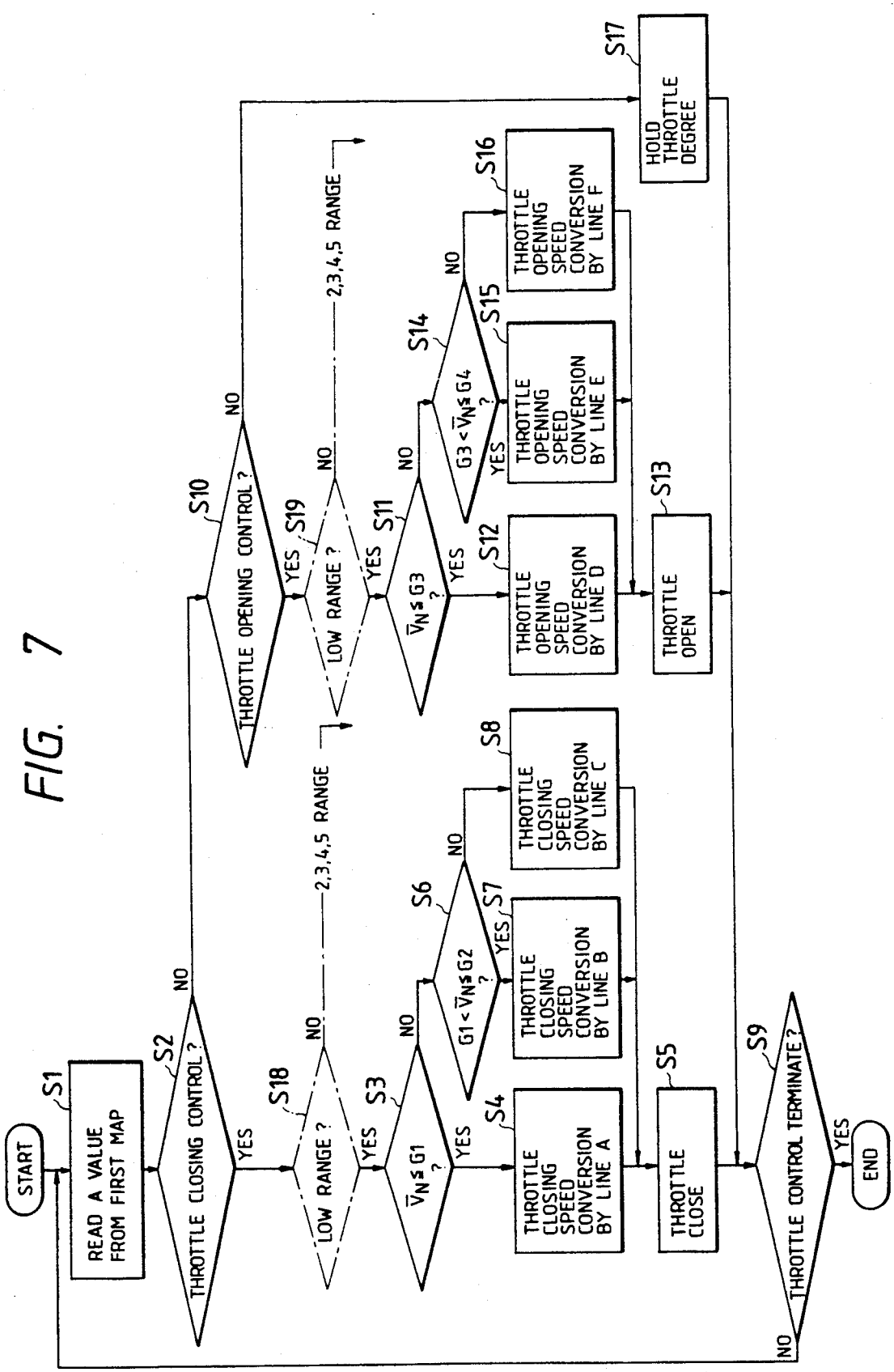
FIG. 7 is a flow-chart showing a throttle operation control routines.

FIG. 7 is a flowchart showing a traction control routine carried out by the control logic circuit 6.

First, a value of the first control map shown in FIG. 2 is read out at step S1, and at step S2 it is judged whether it is under the throttle closing control. At step S2, if judgement is made that it is under the throttle closing control, it is judged whether $\overline{V}_N \leq G1$ at step S3. If judgement at step S3 is "Yes", then the value read from the first control map is converted to a throttle closing speed in accordance with the conversion line A of the second map at step S4, and then the throttle is closed at step S5 on the basis of the throttle closing speed determined at step S4. If judgement at step S3 is "No", then it is judged at step S6 whether $G < \overline{V}_N \leq G2$. If judgement at step S6 is "Yes", the value read from the first map is converted to a throttle closing speed at step S7 on the basis of a conversion line B of the second map and step S5 is carried out. If judgement at step S6 is "No", that is, $G2 < \overline{V}_N$, then the value read from the first map is converted to a throttle closing speed on the basis of the conversion line C of the second map at step S8 and after that step S5 is carried out. At step S9, judgement is made as to whether the throttle control terminates, and if judgement at step S9 is "No", the operation is returned to step S1.

If judgement at step S2 is "No", then judgement is made at step S10 as to whether the throttle opening control is actuated. If judgement at step S10 is "Yes", then judgement is made at step S11 as to whether $\overline{V}_N \leq G3$. If judgement at step S10 judges "Yes", the value read from the first control map shown in FIG. 2 is converted at step S12 to a throttle opening speed on the basis of the conversion line D shown in FIG. 4, and then the throttle opens according to the throttle opening speed thus determined at step S13. If judgement at step S11 is "No", then judgement is made at step S14 as to whether $G3 \leq \overline{V}_N < G4$, and if judgement at step S14 is "Yes", the value read from the first map is converted to a throttle opening speed at step S15 in accordance with the conversion line E of the third map shown in FIG. 4, and then step S13 is carried out. If judgement at step S14 is "No", that is, $G4 < \overline{V}_N$, the value read from the first map is converted to a throttle opening speed at step S16 on the basis of the conversion line F of the third map shown in FIG. 4 and, after that, step S13 is carried out. Further, if judgement at step S10 is "No", the throttle opening degree is maintained by actuation of step S17

In the throttle control described above, each of the throttle opening and closing speed may be compensated by corresponding to a gear position of the power transmission device detected by the gear position sensor 14 shown in FIG. 1. In this case, steps S18 and S19 shown by chain line may be added between steps S2 and S3 and steps S10 and S11, respectively. In an arrangement shown in FIG. 7, at both steps S18 and S19, judgement is merely made as to whether a gear positions at a low range. The other judgement as to whether the gear positions at a second, top or over-top range will not be explained since the same operation as in the case of the low range is carried out. In case the throttle control is actuated in view of a position of the gear, the predetermined values G1 to G4 may be compensated for or varied in accordance with the position of the gear, or the gradient of the conversion lines A to F may be compensated for or varied in accordance therewith. Further, both the predetermined acceleration values G1 to G4 and the conversion lines A to F may be compensated.

As described above, according to a traction control method and apparatus of the present invention, the throttle opening and closing operation are controlled according not only to a difference in speed between the driving and non-driving wheel speeds but also to an acceleration of the driving and non-driving wheels. Therefore, a throttle operation can appropriately be controlled with high accuracy corresponding to a slip condition of the driving wheel of the vehicle.

What is claimed is:

1. A method of controlling a traction of a vehicle, comprising the steps of:

reading a value from a first control map, said value corresponding to a difference between a driving wheel speed and a non-driving wheel speed and to a driving wheel acceleration; and converting said value to one of a throttle opening speed and a throttle closing speed in accordance with a conversation rate corresponding to a non-driving wheel acceleration by reading a value from a second control map in accordance with said value read from said first control map and said non-driving wheel acceleration, said throttle closing speed being inversely proportional to said non-driving wheel acceleration, to control said traction of said vehicle.

2. The method according to claim 1, wherein said throttle closing speed is inversely proportional to said non-driving wheel acceleration and said throttle opening speed is proportional to said non-driving wheel acceleration.

3. The method according to claim 1, wherein the step of converting said value to said throttle opening speed includes the substep of reading a value from a third control map in accordance with said value read from said first control map and said non-driving wheel acceleration wherein said throttle opening speed is proportional to said non-driving wheel acceleration.

4. A method of controlling a traction of a vehicle, comprising the steps of:

reading a value from a first control map, said value corresponding to a difference between a driving wheel speed and a non-driving wheel speed and to a driving wheel acceleration; and converting said value to one of a throttle opening speed and a throttle closing speed in accordance with a conversation rate corresponding to a non-driving wheel acceleration and a gear position of a power transmission device of said vehicle to control said traction of said vehicle.

5. The method according to claim 4, wherein said throttle closing speed is inversely proportional to said non-driving wheel acceleration and said throttle opening speed is proportional to said non-driving wheel acceleration.

6. The method according to claim 4, wherein the step of converting said value to said throttle closing speed includes the substep of reading a value from a second control map in accordance with said value read from said first control map and said non-driving wheel acceleration, and wherein said throttle closing speed is inversely proportional to said non-driving wheel acceleration.

7. The method according to claim 4, wherein the step of converting said value to said throttle opening speed includes the substep of reading a value from a third control map in accordance with said value read from said first control map and said non-driving wheel acceleration wherein said throttle opening speed is proportional to said non-driving wheel acceleration.

* * * * *